Oct. 4, 1966 T. PLOTKIN 3,276,791
PERSONAL CREDIT PURCHASING SYSTEM
Filed March 4, 1964
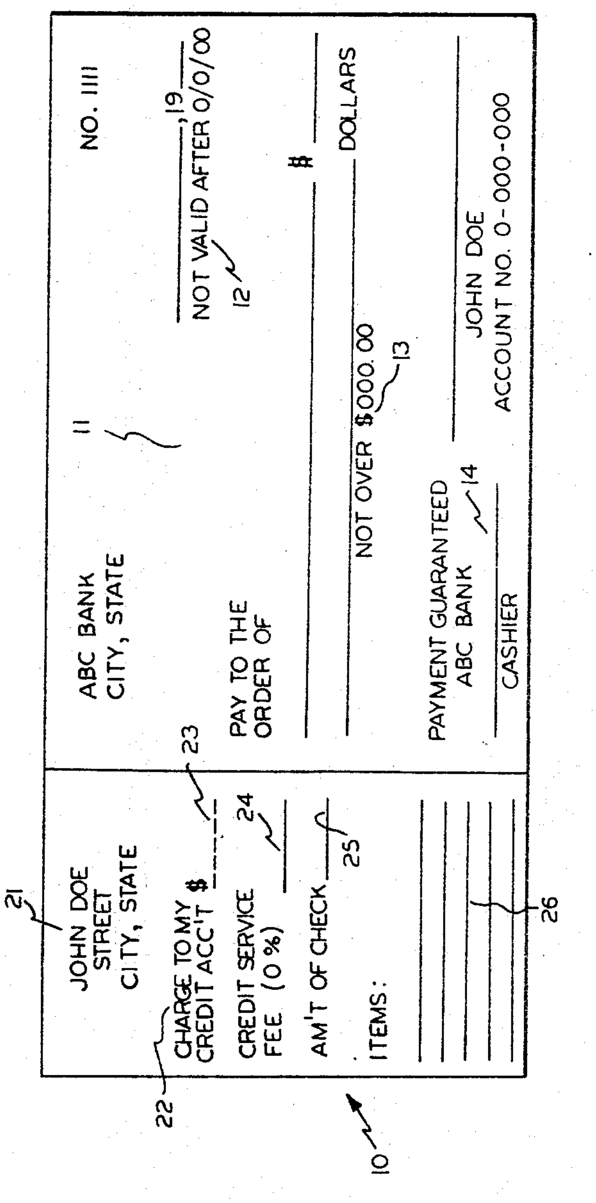
INVENTOR
THEODORE PLOTKIN
BY
Paris, Haskell & Levine
ATTORNEYS United States Patent Office 3,276,791
Patented Oct. 4, 1966

3,276,791
PERSONAL CREDIT PURCHASING SYSTEM

Theodore Plotkin, 180 Clark Road, Brookline, Mass.

Filed Mar. 4, 1964, Ser. No. 349,251
3 Claims. (Cl. 283—57)

The present invention relates to a personal credit purchasing system. More particularly, the credit system of this invention is based on the use of guaranteed checks, whereby credit purchases become in effect equivalent to cash transactions for the vendors, and the credit service fee is assessed only upon use of the checks and in accordance with the amounts thereof.

Prevalent present day personal credit buying systems are credit card systems, wherein the purchaser is identified by a credit card. The credit card identifies the purchaser as approved by the company issuing the credit card, and enables the purchaser to buy goods and services from a vendor on credit guaranteed by the credit card issuing company. The vendor then must report and collect its credits from the credit card company, which in turn must bill and collect from the credit card purchaser. For the guarantee and central credit service thus offered by the credit card company, it collects a fee from the vendor based on a percentage of its credit card sales.

The card system of credit as above described is expensive in several respects. There is duplicate bookkeeping and record keeping, because both the vendor and the credit card company must maintain records of accounts on the credit purchases; and in addition, the vendor must carry certain amounts of credits until payments are received from the credit card company. The credit system of the present invention, however, requires only one bookkeeping activity, and that activity is efficiently effected as a normal banking check transaction procedure. In addition, for the vendor, the ostensible credit transaction is in fact an immediate cash transaction, requiring no bookkeeping, no record keeping, and no carrying of credits on his part.

The present credit system utilizes special checks issued to approved credit customers, and guaranteed either by the drawee bank or the credit system company. These instruments include the usual check pay order to be completed to the benefit of a vendor, and a second order to the check issuer or drawee to charge the customer's credit account by a different amount. The latter amount is the face amount of the purchase, and the usual pay order to the benefit of the vendor is less than that by a factor representing the credit service fee involved. The credit service fee is usually a predetermined percentage of the purchase price as fixed by the credit system company. Since the checks are guaranteed, the pay order to the benefit of the vendor is the equivalent of cash to him, and it may be deposited to the credit of his account with the other daily receipts of the business. The check is then processed through the usual banking procedures and is presented at the drawee bank, whereupon the customer's credit account is charged the amount specified on the instrument in the charge order.

It is, therefore, one object of the present invention to provide a personal credit purchasing system.

Another object of the present invention is to provide such a credit system utilizing guaranteed checks as its vehicle.

A further object of the present invention is to provide such a credit system wherein the ostensible credit transaction is in fact a cash transaction for the vendor.

Still another object of the present system is to provide a personal credit buying system requiring less record keeping than previous systems.

And another object of the present invention is to provide a credit system utilizing conventional banking facilities for effecting the complete transaction and record keeping.

An additional object of the present invention is to provide a guaranteed check system, wherein the guaranteeing fee is not charged until the check is used.

A further object of the invention is to provide a novel instrument for monetary transactions.

And still another object of the invention is to provide a method of effecting personal credit purchases.

Other objects and advantages of the present invention will become apparent from a consideration of the following detailed description of the invention, had in conjunction with the accompanying drawing, which is one specific and illustrative form of a double order instrument for monetary transactions utilized for effecting the personal credit purchasing method of the present invention.

As stated above, operation of the present system of credit is dependent upon a guaranteed check, such as shown in the accompanying drawing. The instrument 10 comprises a check portion designated by the numeral 11 which is of usual form, except that a time limit is placed on its validity at 12, a maximum value is designated at 13, and a guarantee is set forth at 14.

In addition to the usual check order set forth in part 11 of the instrument 10, a second order is set forth in part 21 at 22, namely an order for the bank or drawee to charge the drawer's credit account by an amount to be inserted in space 23. Under space 23 is a space 24 for insertion of a service fee. This fee is that percentage of the transaction which constitutes the fee of the credit service company and/or the bank for consummating the present transaction, i.e. guaranteeing the check and maintaining the credit account for the purchaser-drawer. Space 25 under space 24 is for entry of the difference between the amount entered at space 23 and that at space 24, and this difference is the amount for which the guaranteed check portion 11 is made out. In order to provide a complete record for the purchaser, provision is made at 26 for entry of the items or services purchased by the instrument.

Thus, in using this instrument, the purchaser ascertains the list price for the goods or services he is purchasing and enters that amount in space 23. He then computes the established credit service fee, which is a percentage of the transaction fixed by the credit service company—i.e. the bank issuing the guaranteed checks or a separate credit service company operating through the bank—and enters that amount in space 24. The difference is entered in space 25, and that is the amount for which the check portion 11 is made. When the check portion 11 is completed in the usual manner and signed by the purchaser-drawer, it is handed to the vendor. In the hands of the vendor, the guaranteed check 11 is the equivalent of cash, and may be negotiated, deposited, or cashed in the usual course of business without any need for record keeping or carrying any credits.

Instruments embodying guaranteed checks of the type hereinabove described and constituting a portion of the present invention are placed into commerce in accordance with the credit procedure of the present invention. An issuing bank first opens a credit or loan account for an approved customer, either on its own initiative or under the auspices of a credit service company, authorizing the customer to draw upon that account up to a specified amount. The customer is expected to repay the account on thirty day monthly bank statements, for example, or on any other appropriate loan or credit basis selected. An appropriate number of guaranteed check instruments as above-described are then issued by the bank to the customer. These checks are provided at 13 with various maximum amount limitations, enabling the customer to select a check approximating the amount of a particular transaction. The number of checks issued, and the maximum amounts set forth at 13 are selected to have an aggregate maximum value appropriately related to the maximum specified amount of the customer's loan account. This may, for example, be double the value of the loan account to afford the customer an adequate number of checks and flexibility in their use to effect transactions with checks having maximum values appropriate for the transactions he desires. The check supply may of course be replenished as required.

Although it may not be essential, it is preferred that the customer also be issued an identification card, carrying his signature and having an account number corresponding to that on his checks, to minimize the possibility of unauthorized use of the guaranteed checks, forgeries, and counterfeiting of the checks. Obviously, the identification card and/or the check may state the requirement that the check be signed in the presence of the vendor, and the signature be compared with that on the card. The use of an identification card coupled with the expiration date printed on the checks at 12 minimize the possibility of unauthorized use of the checks.

With a supply of guaranteed checks, the customer may purchase any goods or services up to the limit of his loan account with the bank, from any vendors who are willing to accept the small percentage discount from their list prices as required to cover the credit service fees. Since this credit service fee is present in substantially all general credit card systems, it is apparent that the customer can deal on this basis with any vendor willing to accept credit card customers, because the present system is inherently less expensive and more advantageous to the vendor.

Payment for the goods or services is effected by inserting at space 23 on the instrument the list price for the goods or services, at space 24 the credit service fees for the amount entered at 23, and at space 25 the difference between these two figures which is the amount used in making out the check portion 11. The check is then signed and utilized as payment for the goods or services. The vendor deposits or cashes the check receiving immediate cash for the amount of the check 11; whereupon, the instrument is processed through the normal bank channels, and is presented at the issuing bank drawee which charges the purchaser-drawer's loan account in accordance with the amount entered at 23, pursuant to the order at 22. The customer receives a monthly statement of his loan account from the bank, and the cancelled instruments 10, providing a complete record of his expenditures. Repayment of the loan account may be effected monthly, or on any other basis agreed upon by the bank and customer.

In the foregoing personal credit system it should be understood that the guarantee on the checks may be by the drawee bank or a separate credit service company. Also responsibility for the system and for the customers may be had by the bank or the separate credit service company. For example, the company may be the contracting party with the customer and the guarantor, with the bank functioning merely as a depository or vehicle for the credit service company. Alternatively, the bank may be the contractor and guarantor, acting independendly or as a franchisee of the credit service company. Therefore, when using the term credit service company in the appended claims, it should be understood to include a bank and/or a separate company, individually or conjointly.

Since the preferred form of the invention is contemplated as a credit system, or method of extending credit, the foregoing description refers to the establishment of a loan account for the customer. It should be understood that the double order instrument described, and the procedure of its use, might if desired be applied to a customer's deposit account to which the customer has deposited credits in advance of writing the checks for the purpose of guaranteeing or certifying checks drawn against such account. By this vehicle the customer is free to make out his own certified or guaranteed check in an exact amount for a purchase as required, and enter an order for the bank to charge his account a certifying fee computed on the basis of the amount of the check and charged only when used. In this instance, the portion 21 of the instrument shown in the drawing would be utilized slightly differently. In space 23 one would enter the amount of check 11, in space 24 the percentage fee charged by the bank for the guarantee service, and in space 25 the sum of these two figures. This latter entry would be the amount of the second order of the instrument 10, authorizing the bank to charge the drawer's deposit account by such amount.

Having thus presented a detailed exemplary description of one embodiment of the invention to enable a complete understanding thereof, it is apparent that various changes and modifications will appear to those skilled in the art. Accordingly, such changes and modifications as are embraced by the spirit and scope of the following claims are contemplated as being within the purview of the present invention.

What is claimed is:

1. A method of extending credit by a credit service company to a customer for use in purchasing services and goods from vendors, comprising establishing a credit with the credit service company for the customer, issuing by the company to the customer a plurality of double order instruments, each instrument having as the first order a guaranteed check blank and as the second order a blank order to the drawee to charge the customer's account, completing the second order by the customer in the amount of a purchase, completing the first order by the customer to the benefit of the vendor in the amount of the purchase less a predetermined credit service charge, depositing the instrument in normal banking procedures by the vendor for immediate credit in the amount of the check presenting the instrument to the drawee thereof for payment in accordance with said first order, and charging against the customer's credit the amount of said second order.

2. A method as set forth in claim 1, wherein each of said instruments has a maximum monetary limit indicated thereon.

3. A method as set forth in claim 2, wherein each of said instruments has an expiration date indicated thereon.

References Cited by the Examiner

UNITED STATES PATENTS

| | | | |
|---|---|---|---|
| 735,665 | 8/1903 | Gray | 283—58 |
| 777,149 | 12/1904 | Scudder | 283—7 |
| 1,112,654 | 10/1914 | Pleiderer | 283—58 |
| 1,208,579 | 12/1916 | Kuehn | 283—58 |
| 1,272,340 | 7/1918 | Kemp | 283—58 X |
| 1,423,744 | 7/1922 | Sterling | 283—58 |

LAWRENCE CHARLES, *Primary Examiner.*